United States Patent [19]

Graven et al.

[11] Patent Number: 4,937,051
[45] Date of Patent: Jun. 26, 1990

[54] CATALYTIC REACTOR WITH LIQUID RECYCLE

[75] Inventors: Richard G. Graven, Pennington; John C. Zahner, Princeton, both of N.J.

[73] Assignee: Mobil Oil Corporation, New York, N.Y.

[21] Appl. No.: 74,760

[22] Filed: Jul. 17, 1987

Related U.S. Application Data

[63] Continuation-in-part of Ser. No. 795,816, Nov. 7, 1985, Pat. No. 4,681,674.

[51] Int. Cl.$^5$ .............................. B01J 8/00; B01J 8/02; B01J 10/00
[52] U.S. Cl. ........................................ 422/194; 261/97; 261/98; 261/149; 261/150; 261/151; 422/106; 422/110; 422/111; 422/191; 422/195; 422/234; 422/235
[58] Field of Search ............... 422/191, 110, 111, 106, 422/195, 234, 235, 194; 261/97, 98, 149, 150, 151

[56] References Cited

U.S. PATENT DOCUMENTS

| | | | |
|---|---|---|---|
| 2,411,760 | 11/1946 | Sensel | 422/191 X |
| 2,826,601 | 3/1958 | Barsky | 260/465.6 |
| 3,250,757 | 5/1966 | Smith et al. | 422/110 X |
| 3,378,349 | 4/1968 | Shirk | 422/194 |
| 3,592,612 | 11/1966 | Ballard et al. | 422/195 X |
| 3,600,299 | 8/1971 | Koller | 208/89 |
| 3,607,091 | 9/1971 | Boyd | 23/253 |
| 3,652,451 | 3/1972 | Boyd | 208/59 |
| 3,723,300 | 3/1973 | Carson et al. | 208/59 |
| 3,728,249 | 4/1973 | Antezana et al. | 208/58 |
| 3,824,081 | 4/1972 | Smith et al. | 422/194 X |
| 4,191,632 | 3/1980 | Cosyns et al. | 585/483 |
| 4,213,847 | 7/1980 | Chen et al. | 208/111 |
| 4,239,614 | 12/1980 | Hutchings | 208/108 |
| 4,280,990 | 7/1981 | Jagodzinski et al. | 422/191 X |
| 4,313,817 | 2/1982 | Mayer et al. | 208/89 |
| 4,313,908 | 2/1982 | Gupta | 261/97 X |
| 4,430,203 | 2/1984 | Cash | 208/210 |
| 4,471,147 | 9/1984 | Owen et al. | 585/519 |
| 4,669,890 | 6/1987 | Peyrot | 422/195 |
| 4,681,674 | 7/1987 | Graven et al. | 208/59 |

Primary Examiner—Barry S. Richman
Assistant Examiner—Amalia L. Santiago
Attorney, Agent, or Firm—Alexander J. McKillop; Charles J. Speciale; L. Gene Wise

[57] ABSTRACT

A continuous reactor system useful for treating petroleum oil in a multi-phase fixed bed catalytic reactor comprising a system for:

feeding the oil and a reactant gas at production flow rates above a first bed of porous solid catalyst particles under conversion conditions for cocurrent downward flow therethrough, collecting and withdrawing the treated oil from the first bed and redistributing at least a portion of the treated oil to at least one succeeding catalyst bed while permitting the gaseous phase to flow directly to the succeeding lower catalyst bed, recycling a quantity of treated oil collected below a catalyst bed and reapplying the treated oil at a preceding redistribution zone above the bed from which treated oil is collected, whereby the total of oil production flow rate and recycled treated oil flow rate is maintained at a predetermined minimum sufficient to effect uniform catalyst wetting. This technique is useful for hydrodewaxing of oils over zeolite catalysts.

10 Claims, 2 Drawing Sheets

CATALYTIC REACTOR WITH LIQUID RECYCLE

REFERENCE TO COPENDING APPLICATION

This application is a continuation-in-part of copending U.S. patent application Ser. No. 795,816, filed Nov. 7, 1985 now U.S. Pat. No. 4,681,674, incorporated herein by reference.

BACKGROUND OF THE INVENTION

This invention relates to a catalytic reactor wherein a liquid phase reactant is contacted with a gaseous phase reactant. In particular, it relates to an improvement in equipment for contacting multi-phase reactants in a fixed porous catalyst bed under continuous operating conditions, including apparatus for controlling liquid fluid flow in the reactor.

Chemical reactions between liquid and gaseous reactants present difficulties in obtaining intimate contact between phases. Such reactions are further complicated when the desired reaction is catalytic and requires contact of both fluid phases with a solid catalyst. In the operation of conventional concurrent multiphase reactors, the gas and liquid under certain circumstances tend to travel different flow paths. The gas phase can flow in the direction of least pressure resistance; whereas the liquid phase flows by gravity in a trickle path over and around the catalyst particles. Under conditions of low liquid to gas ratios, parallel channel flow and gas frictional drag can make the liquid flow non-uniformly, thus leaving portions of the catalyst bed underutilized due to lack of adequate wetting. Under these circumstances, commercial reactor performance can be much poorer than expected from laboratory studies in which flow conditions in small pilot units can be more uniform.

The segregration of the liquid and gaseous phases in a non-uniform manner in a commercial reactor is sometimes referred to as maldistribution. Attempts have been made to avoid maldistribution, such as the provision of multiple layers of catalyst with interlayered redistributors located along the reactor longitudinal axis. Numerous multi-phase reactor systems have been developed wherein a fixed porous be of solid catalyst is retained in a reactor. Typically, fixed bed reactors have been arranged with the diverse phases being passed cocurrently over the catalyst, for instance as shown in U.S. Pat. Nos. 4,126,539 (Derr et al), 4,235,847 (Scott), 4,283,271 (Garwood et al), and 4,396,538 (Chen et al). While prior reactor systems are satisfactory for certain needs, efficient multi-phase contact has been difficult to achieve for some fixed bed applications when maldistribution occurs as the reactants progress through the catalyst bed, particularly in those instances when the liquid phase is small compared to the gaseous phase. This phenomena of maldistribution developing as reactants pass through the catalyst bed can occur in commercial size large diameter reactors but is not seen in small diameter laboratory units.

In the petroleum refining industry, multi-phase catalytic reactor systems have been employed for dewaxing, hydrogenation, desulfurizing, hydrocracking, isomerization and other treatments of liquid feedstocks, especially heavy distillates, lubricants, heavy oil fractions, residuum, etc. In the following description, emphasis is placed on a selective hydrodewaxing process, which employs a catalyst comprising a medium pore siliceous zeolite having a constraint index of about 1 to 12, for example, an acidic ZSM-5 type pentasil aluminosilicate having a silica to alumina mole ratio greater than 12. It is an object of the present invention to provide a unique reactor system, including concurrent operating techniques and apparatus, adapted for treatment of liquid with a gaseous reactant in a reactor containing a porous fixed bed of solid catalyst. It is a further object to provide means for operatively connecting portions of multi-phase reactors under controlled flow conditions to maintain substantially uniform gas-liquid contact, while minimizing flow and temperature maldistribution patterns and providing downwardly gravitating liquid under substantially uniform and sufficient liquid flux to assure relatively uniform wetting of the catalyst particles. When uniform wetting of the catalyst particles are achieved, commercial reactor performance will be improved to minimize adverse reactions such as coke formation or non-selective cracking reactions and thereby match pilot unit performance.

SUMMARY OF THE INVENTION

A reactor system has been provided for contacting gas and liquid reactant phases with a series of porous catalyst beds, wherein the reactor comprises inlet means for feeding gas and liquid reactant streams, product recovery means, and successive multiple catalyst beds for contacting gas and liquid reactants in concurrent flow. The improvement herein comprises at least one interbed redistributor means comprising a liquid collection reservoir; gas liquid downcomer means passing therethrough; means for withdrawing liquid from the collection reservoir; redistribution means to apply liquid and gaseous reactants uniformly to a succeeding catalyst bed; and means for passing a predetermined portion of liquid from the collection reservoir to a catalyst bed preceding the interbed redistributor means.

These and other features and advantages of the invention will be seen in the following description and drawing.

DESCRIPTION OF PREFERRED EMBODIMENTS

Figure 1:
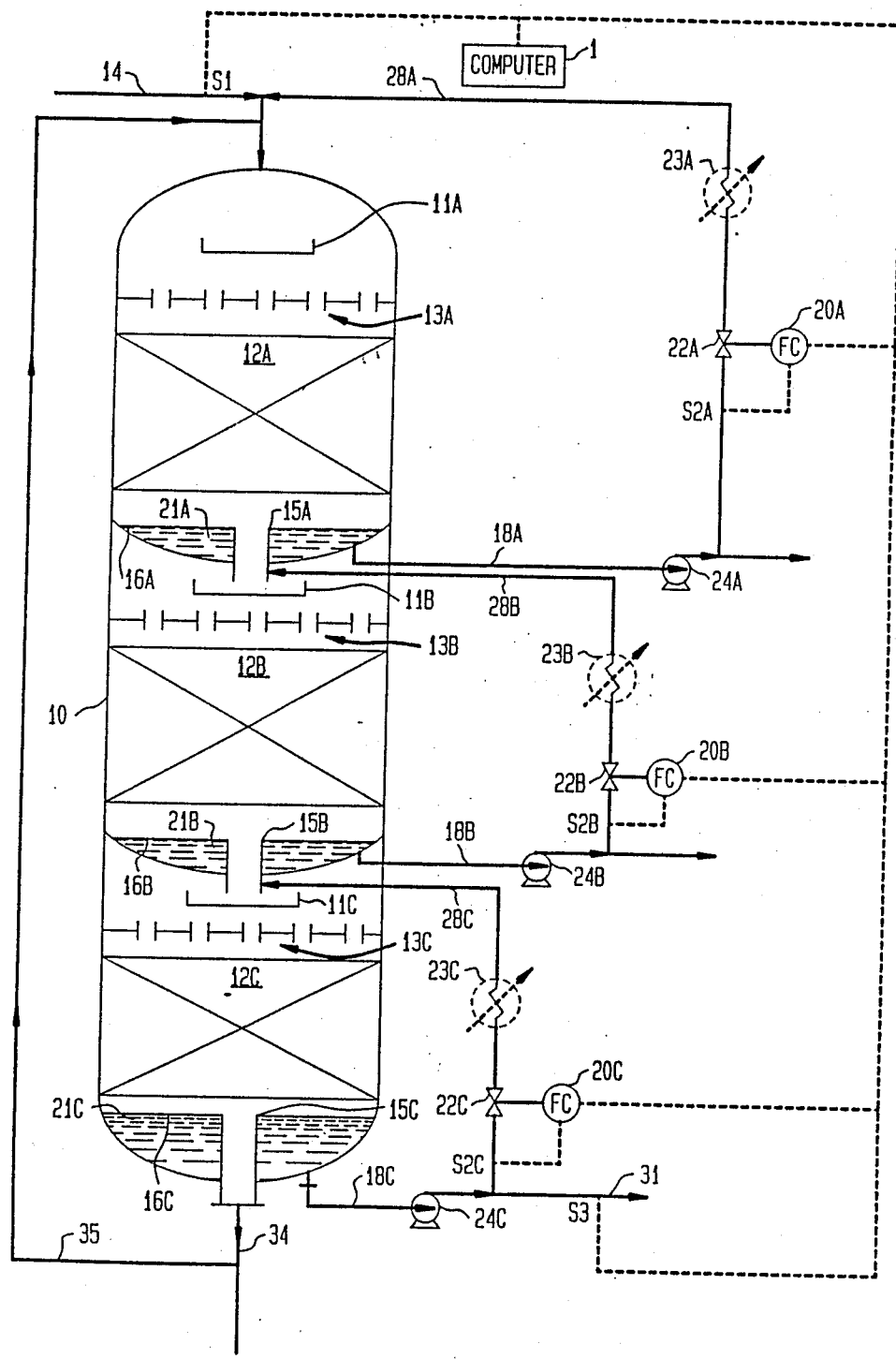
FIG. 1 is a simplified process diagram showing a vertical reactor with fixed catalyst beds, showing major flow streams and distribution equipment.

Primary emphasis is placed on a reactor column design with vertically spaced beds; however, one skilled in the art will understand that separate vessels can be employed for successive catalyst bed portions, if desired. The reactor system is depicted schematically in FIG. 1, with the main fluid conduits shown in solid line and control interface signal means in dashed line. A vertical reactor shell 10 is fabricated to enclose and support a stacked series of fixed porous solid catalyst beds 12A, B, C. A mixed feed, comprising liquid oil and gaseous reactants, is introduced via upper inlet means 14. Some of the liquid phase is collected in reservoir 21A and can be withdrawn via conduit 18A under control of a flow controller (FC) 20A and its associated control valve 22A. The withdrawn liquid is circulated by pump 24A and returns to the top of the reactor vessel 10 via conduit 28A for admixture with feedstream 14. The recycle liquid is introduced at a location above the first catalyst bed distribution means. Uniform distribution of liquid and vapor to the catalyst bed is obtained by a suitable distributor tray system 13A and baffle means 11A which are well known in the art. Alternatively conduit 18A could connect to an internal liquid spray header disbributor as shown, for example, in FIG. 3 as a means for distributing recycle liquid over the catalyst bed. Typically, the liquid and gas phases are introduced into the reactor at a desired pressure and temperature; however, it is feasible to adjust the liquid temperature by heat exchange in heat exchanger 23A in the external flow loop, thereby allowing independent control of the temperature in any catalyst bed if this should be desirable.

Partially converted liquid and gas flow downwardly from the initial catalyst contact zone 12A through conduit 15A into the next catalyst zone. Conduit 15A is positioned so liquid collects in an internal head 16A and overflows into conduit 15A. Partially converted liquid and vapor are uniformly distributed to catalyst bed 12B by conventional means such as baffle means 11B and distributor tray means 13B. Flow controller 20A can be adjusted to change recycle rate so a substantially uniform liquid flux to an individual catalyst bed can be achieved under varying feed rates. Recycle liquid is introduced to the catalyst beds at a location between the collection reservoir and the gas-liquid redistribution means.

The operation of the succeeding stages is similar to that described in the initial conversion stage, with corresponding numbered elements being designated by letters A, B, C according to the association with beds 12A, 12B, 12C. Reactant gas can be withdrawn from bed 12C, through conduit 15C and recycled via lines 34 and 35 to the inlet of a proceeding catalyst bed 12A, B, C. Optional heat exchangers 25A, B, C permit the temperature of each recycle stream to be controlled independently. This technique provides thermal control of each catalyst bed section, and permits interstage sampling to determine the degree of conversion achieved in each bed.

Figure 2:
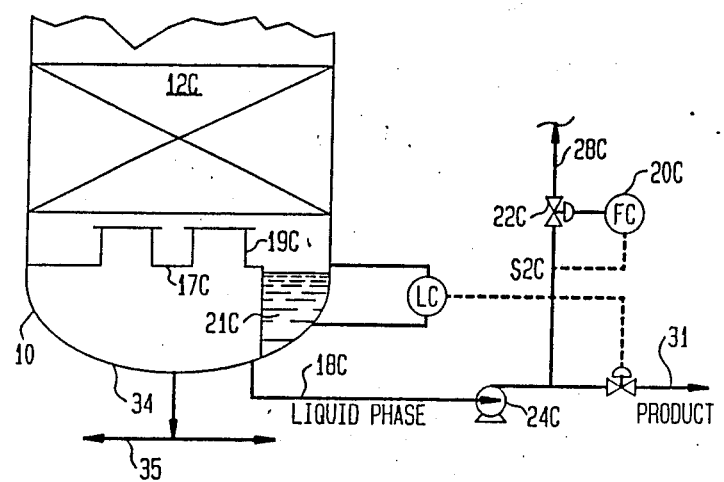
FIG. 2 is a vertical cross-section view of a reactor portion showing a preferred liquid recycle technique.

An alternate design of the reactor outlet is shown in FIG. 2. With this design the fluid from final bed 12C may be separated by baffled runoff means 19C to collect the depleted reactant gas from reactor vessel 10 through bottom gas outlet means 34. This design allows the reactor effluent to be separated into a liquid reactor effluent for product recovery and a hydrogen rich vapor reactor effluent. Since the vapor phase effluent is high in hydrogen content (i.e. 70 to 90 mol%, depending upon heaviness and degree conversion of feedstock), there may be some situations where it could be economic to recycle the hot vapor back to the upper reactor inlet to increase hydrogen circulation and partial pressure. This would probably require a smaller compressor than recycling cold gas from a conventional ambient temperature separate and would improve process thermal efficiency. This feature may apply to lubricant hydrodewaxing, hydrocracking, or residuum hydrotreating.

Treated liquid in the reservoir 21C from the final bed 12C may be recovered via withdrawal conduit 18C and product conduit 31 or partially diverted for recirculation via conduit 28C according to need by valve 22C operatively connected to its section flux control system 20C.

Figure 3:
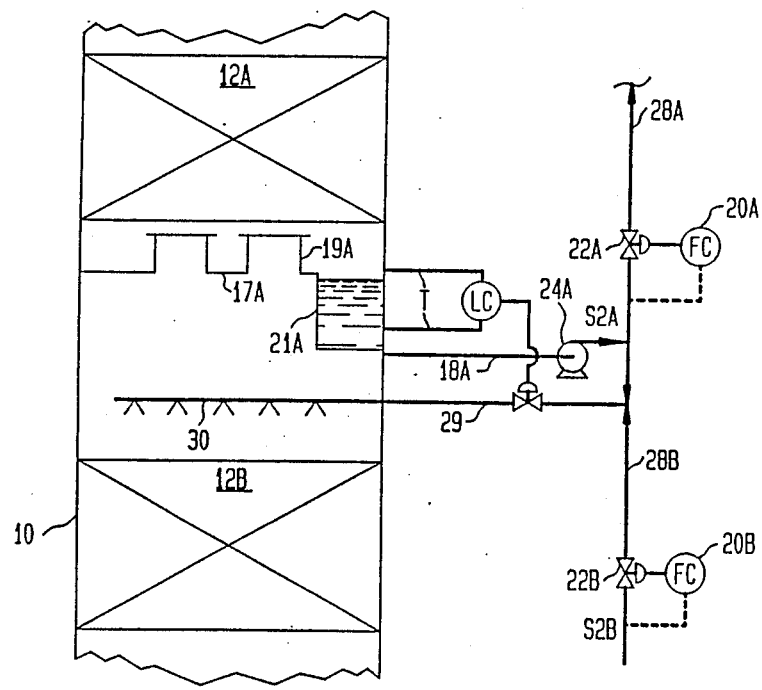
FIG. 3 is a vertical cross section of an interstage reactor portion showing an alternative fluid handling means.

A continuous three-stage reactor system has been described for contacting gas and liquid phases with a series of porous catalyst beds; however, it may be desired to have two, four or more beds operatively connected for successive treatment of the reactants. The catalyst composition may be the same in all beds; however, it is within the inventive concept to have different catalysts and reaction conditions in the separated beds. A typical vertical reactor vessel has top inlet means for feeding gas and liquid reactant streams and bottom product outlet recovery means. The vessel will have at least two vertically-spaced porous catalyst beds supported in the reactor shell for contacting gas and liquid reactants in concurrent flow and top distributor means for applying liquid gas and uniformly over the top bed cross section. The top gas liquid distributor means can comprise the baffle means 11A, B, C and the distributor tray means 13A, B, C (FIG. 1). A distributor plate having gas-liquid downcomer means passing therethrough is a suitable design. An alternate liquid distributor means can comprise sprayheader 30 (FIG. 3). At least one interbed redistributor means will comprise a gravity flow liquid collection reservoir, means for withdrawing liquid, and liquid recirculation means including flow control means for passing a predetermined portion (say 0-50%) of liquid from the collection reservoir to at least one catalyst bed above the interbed redistributor means. Design and operation can be adapted to particular processing needs according to sound chemical engineering practices, for instance, see Satterfield, AICHE Journal, 21 (2), 209, 1975 relating to contacting efficiency of liquid rate.

FIG. 3 is a vertical cross section view of the reactor showing an interstage segment. The typical interstage reactor section comprises a cylindrical metal shell 10 having catalyst beds 12A, 12B adapted to receive gas and liquid from the above bed and pass this effluent mixture to the baffled phase separator means 19A. Liquid is collected from a horizontal collector plate 17A and runs across this plate to a runoff liquid collection reservoir means 21A. Liquid level may be sensed at this point via pressure taps T operatively connected to the corresponding level control (LC). Outlet conduit 18A permits liquid to be withdrawn for circulation. This liquid (18A), combined with the diverted flow line 28B from the succeeding stage 12B is introduced for recirculation via conduit 29.

Liquid distribution is achieved by any conventional technique, such as distributor trays or spray headers 30, which projects the liquid onto the lower bed surface 12B at spaced points. A layer of porous balls, screen or perforated plate may be employed to facilitate uniform distribution. The liquid phase again contacts reactant gas, which passed through the baffle means via vapor hats in a known manner.

The reactor system can be provided with liquid level control means responsive to liquid level in the collection reservoir, and recirculation flow control means for recirculating liquid from the collection reservoir at an inverse rate to liquid feed entering the reactor column top inlet means, thereby maintaining a substantially constant total liquid flux rate in the catalyst bed above the interbed redistribution means under varying liquid feed rates.

In a preferred mode of flow control useful with this novel system, the volume of material recycled back to the top of a particular catalyst bed can be varied or the total recycle flow can be maintained constant. In this manner, flows to the spray headers may be fixed by the operator, while the volume of liquid recycled is automatically varied. Alternatively, diverter conduit flow can be used for measuring and controlling total flow.

While either mode of control may be acceptable, specific applications will determine the preferable mode of control. With the use of a process control computer 1 to send and receive signals from all flow measuring points, switching from the various mode of control can be effected. A suitable control system may include sensor 1 means for generating a first signal representative of liquid feed rate to the reactor inlet, flow sensor means S 2A, B, C for generating a second signal representative of liquid recirculation rate, the recirculation control means having means for adding the first and second signals and controlling the liquid recirculation rate to provide the total liquid flux rate. The control system, including sensor 3 at product outlet line 31, can measure the production rate of the oil feed, compare the production rate with a predetermined total design flow rate, and increase recycle of treated oil in at least one bed so that the total of the production rate and recycle rate is maintained substantially equal to a predetermined design bed flux rate.

The present technique is adaptable to a variety of interphase catalytic reactions, particularly for treatment of heavy oils with hydrogen-containing gas at elevated temperature. Industrial processes employing hydrogen, especially petroleum refining, employ recycled impure gas containing 10 to 50 mole % or more of impurities, usually light hydrocarbons and nitrogen. Such reactant gases are available and useful herein, especially for high temperature hydrocracking and/or hydrogenolysis at superatmospheric pressure.

In the refining of lubricants derived from petroleum by fractionation of crude oil, a series of catalytic reactions are employed for severely hydrotreating, converting and removing sulfur and nitrogen contaminants, hydrocracking and isomerizing components of the lubricant charge stock in one or more catalytic reactors. This can be followed by hydrodewaxing and/or hydrogenation (mild hydrotreating) in contact with different catalysts under varying reaction conditions. An integrated three-step lube refining process disclosed by Garwood et al, in U.S. Pat. No. 4,283,271 is adaptable according to the present invention.

In a typical multi-phase reactor system, the average gas-liquid volume ratio in the catalyst zone is about 1:4 to 20:1 under process conditions. Preferably the liquid is supplied to the catalyst bed at a rate to occupy about 10 to 50% of the void volume. The volume of gas may decrease due to reactant depletion, as the liquid feedstock and gas pass through the reactor. Vapor production, adiabatic heating or expansion can also affect the volume.

Advantageously, the multi-phase reactor system is operated to achieve uniform distribution and substantially constant liquid flux. If too little liquid flux is maintained, the catalyst surface in the porous bed may become dry or permit excessive channeling of the gas phase. Flow rates for both reactant phases are controlled within constraints, whereby proper operation of the reactor can be assured.

Advantageously, the catalyst bed has a void volume fraction greater than 0.25. Void fractions from 0.3 to 0.9 can be achieved using loosely packed polylobal or cylindrical extrudates, providing adequate liquid flow rate component for uniformly wetting catalyst to enhance mass transfer and catalytic phenomena.

Catalyst size can vary widely within the inventive concept, depending upon process conditions and reactor structure. If a low space velocity or long residence in the catalytic reaction zone is permissible, catalysts having an average maximum dimension of 1 to 5 mm may be employed.

Reactor configuration is an important consideration in the design of a continuously operating system. In its simplest form, a vertical pressure vessel is provided with a series of stacked catalyst beds of uniform cross-section. A typical vertical reactor having a total catalyst bed length to average width (L/D aspect) ratio of about 1:1 to 20:1 is preferred. Stacked series of beds may be retained within the same reactor shell; however, similar results can be achieved using separate side-by-side reactor vessels, with pumps moving liquid from lower levels to higher inlet points above succeeding downstream beds. Reactors of uniform horizontal cross section are preferred; however, non-uniform configurations may also be employed, with appropriate adjustments in the bed flux rate and corresponding recycle rates.

The invention is particularly useful in catalytic hydrodewaxing of heavy petroleum gas oil lubricant feedstock at an hourly liquid space velocity not greater than $2 \text{ hr}^{-1}$, preferably about $1 \text{ hr}^{-1}$, over randomly packed beds of 1.5 mm extrudate catalyst of the ZSM-5 type zeolite catalyst having a porosity (apparent void volume fraction) of 0.35 to 0.4 usually at a catalyst loading of about 40 pounds/ft$^3$. The hydrocarbon oil has a viscosity of 0.1 to 1 centipoise. Advantageously, the liquid flux rate for total feed rate plus recycle is maintained at about 2000 pounds/ft$^2$-hr, with a total column in height of 50 feet. The reactant gas is fed at a uniform volumetric rate per barrel of oil. While the invention has been explained by reference to preferred embodiments, there is no intent to limit the inventive concept, except as set forth in the following claims.

What is claimed is:

1. A vertical reactor column for continuous contacting of gas and liquid reactants with a series of porous catalyst beds comprising
    inlet means at the top of the reactor column for feeding gas and liquid reactants, gas recovery and liquid product recovery outlet means at the bottom of the reactor column, multiple vertically spaced catalyst beds supported in the column comprising a first catalyst bed and at least one succeeding catalyst bed for continuous contacting gas and liquid reactants with catalyst in concurrent downward flow through the reactor column;
    interbed redistributor means disposed between the catalyst beds comprising a liquid collection reservoir, gas-liquid downcomer conduit means passing through the liquid collection reservoir, gas-liquid redistribution means disposed below said liquid collection reservoir to convey and uniformly distribute the gaseous reactant and a portion of the liquid reactant in the reservoir directly to the succeeding catalyst bed;
    withdrawal conduit means for withdrawing a portion of the reactant liquid from the collection reservoir, recycle conduit means for recycling the withdrawn liquid to a gas-liquid redistribution means disposed above the catalyst bed from which the liquid came, said recycle conduit means introducing the recycle liquid to the first catalyst bed at a location above the first catalyst bed and said recycle conduit means introducing the recycle liquid in each said succeeding catalyst bed at a location between the collection reservoir and the gas-liquid redistribution means located above the respective succeeding catalyst bed, said redistribution means being capable of uniformly distributing the recycle liquid on the catalyst bed.

2. The reactor column of claim 1 further comprising liquid level sensing means disposed in each said liquid collection reservoir and responsive to the liquid level in each said reservoir, liquid feed sensing means disposed in the feed inlet means to the reactor column to sense the liquid feed rate to the reactor column, recycle sensing means disposed in the recycle conduit means to sense the rate of the reactant liquid recycle, and recirculation flow control means operatively connected to the liquid level sensing means, liquid feed sensing means and recycle sensing means, for recycling liquid from each said liquid collection reservoir at an inverse rate to the liquid entering the reactor column inlet at the top of the reactor column, said recirculation flow control means being capable of maintaining a substantially constant total liquid flux rate in the catalyst bed under varying liquid feed rates.

3. The reactor of column 1 further comprising liquid feed sensing means disposed in the feed inlet means to the reactor column to sense the liquid feed rate to the reactor column, recycle sensing means disposed in the recycle conduit means to sense the rate of reactant liquid recycle, and recirculation flow control means operatively connected to the liquid feed sensing means and recyle sensing means, said recirculation flow control means being capable of controlling the recirculation rate of the liquid withdrawn from each said liquid collection reservoir and being capable of maintaining a substantially constant total liquid flux rate in the catalyst bed.

4. A continuous multi-phase reactor column system for contacting reactant gas with liquid petroleum oil reactant in a series of successive fixed beds of catalytic solids comprising
inlet means for feeding the liquid petroleum oil reactant and the reactant gas containing hydrogen above a first catalyst bed of porous catalyst particles for continuous concurrent downward flow through the catalyst bed,
a liquid collection reservoir disposed beneath the first catalyst bed and beneath at least one succeeding catalyst bed to collect the treated petroleum oil, gas-liquid downcomer conduit means passing through the liquid collection reservoirs, gas-liquid redistribution means disposed below said liquid collection reservoirs to convey and uniformly distribute the gaseous hydrogen reactant and a portion of the petroleum oil in the reservoir directly to the succeeding catalyst bed of porous catalyst particles;
withdrawal conduit means for withdrawing a portion of the treated liquid petroleum oil from the first catalyst bed liquid collection reservoir and recycle conduit means connected to the withdrawal conduit means for recycling the withdrawn treated liquid petroleum oil to a gas-liquid distribution means disposed above the first catalyst bed to uniformly distribute the treated liquid petroleum oil on the first catalyst bed, the recycle conduit means introducing the recycle liquid in a succeeding catalyst bed at a location between the collection reservoir of a preceding catalyst bed and the gas liquid redistribution means of the respective succeeding catalyst bed and recycle flow control means in operative relationship with the feed inlet means and the recycle conduit means to control the recirculation rate of the treated liquid petroleum oil withdrawn from the liquid collection reservoir at sufficient liquid flux rate to effect substantially uniform catalyst wetting by the inlet liquid petroleum oil feed and the recycle treated liquid petroleum oil feed.

5. The reactor system of claim 4 further comprising liquid feed sensing means disposed in the feed inlet means to sense the liquid feed rate to the reactor system, recycle sensing means disposed in the recycle conduit means to sense the rate of treated liquid petroleum oil recycle and valve means disposed in the recycle conduit means, and control means operatively connected to the inlet sensing means, the recycle sensing means and the valve means in the recycle conduit to control the recycle rate of the treated petroleum oil so that the total of the liquid petroleum oil feed rate and the recycle rate of the treated liquid petroleum oil is equal to a desired total catalyst bed flux rate.

6. The reactor system of claim 4 further comprising heat exchange means operatively connected to the recycle conduit means, said heat exchange means being capable of independently controlling the temperature of the recycled treated liquid petroleum oil recycled to a catalyst bed.

7. The reactor system of claim 4 further comprising gas-liquid separation means disposed below the last catalyst bed in the reactor system, conduit means for withdrawing the separated gas from the reactor system and gas recycle conduit means for recycling a portion of the withdrawn gas to the first catalyst bed.

8. A continuous catalytic reactor column for contacting oil and a treating gas in a multiphase fixed bed catalytic reactor having at least two operatively connected catalyst beds comprising
inlet means for feeding the oil and treating gas above a first horizontal porous catalyst bed of catalyst particles for concurrent downward flow through the catalyst bed;
a liquid collection reservoir disposed below the first catalyst bed and below at least one succeeding catalyst bed, a gas-liquid downcomer conduit means passing through the liquid collection reservoirs, gas-liquid redistribution means disposed below said liquid collection reservoirs and operatively connected to the gas-liquid downcomer conduit means to convey and uniformly redistribute the gaseous treating gas and a portion of the treated oil in the reservoirs directly to the succeeding horizontal porous bed of catalyst particles,
withdrawal conduit means for withdrawing a portion of the treated oil from the collection reservoir in the succeeding catalyst bed, recycle conduit means and pump means for recycling the withdrawn treated oil to a gas-liquid redistribution means disposed above the catalyst bed from which the liquid came and for introducing the recycle liquid at a location between the collection reservoir of a preceding catalyst bed and the gas-liquid redistribution means of the succeeding catalyst bed; and sensing means disposed in the oil feed inlet means to the reactor to sense the oil feed rate to the reactor, recycle sensing means disposed in the recycle conduit means to sense the rate of treated oil recycle and control means capable of comparing the oil feed rate with a total desired flow rate and capable of adjusting the recycle rate of treated oil in at least one catalyst bed so as to maintain a total liquid flux rate in that catalyst bed sufficient to provide catalyst wetting.

9. The apparatus of claim 8 including means for maintaining total liquid feed rate at weight hourly space velocity of about 1-2 $hr^{-1}$, based on total catalyst weight in the apparatus.

10. The apparatus of claim 8 including means for maintaining total liquid flux in at least one catalyst bed at a rate of about 2000 pounds/$ft^2$ hr.

* * * * *